United States Patent
Lev-Ami et al.

(10) Patent No.: US 7,437,204 B2
(45) Date of Patent: Oct. 14, 2008

(54) METHOD AND APPARATUS FOR MONITORING HOST TO TOOL COMMUNICATIONS

(75) Inventors: Uzi Lev-Ami, Mountain View, CA (US); Yossef Llan Reich, Nes-Ziona (IL)

(73) Assignee: MKS Instruments, Inc., Andover, MA (US)

( * ) Notice: Subject to any disclaimer, the term of this patent is extended or adjusted under 35 U.S.C. 154(b) by 113 days.

(21) Appl. No.: 11/565,209

(22) Filed: Nov. 30, 2006

(65) Prior Publication Data

US 2007/0094548 A1    Apr. 26, 2007

Related U.S. Application Data

(60) Division of application No. 09/935,213, filed on Aug. 22, 2001, now Pat. No. 7,200,671, which is a continuation-in-part of application No. 09/847,937, filed on May 2, 2001, now Pat. No. 7,072,985.

(60) Provisional application No. 60/227,408, filed on Aug. 23, 2000.

(51) Int. Cl.
*G06F 19/00* (2006.01)

(52) U.S. Cl. .................... 700/96; 700/108; 700/174; 709/204

(58) Field of Classification Search .................. 700/90, 700/96, 108, 116, 121, 174; 702/57, 117; 709/204, 217–219
See application file for complete search history.

(56) References Cited

U.S. PATENT DOCUMENTS

| | | | | |
|---|---|---|---|---|
| 5,432,702 | A * | 7/1995 | Barnett | 700/116 |
| 6,950,716 | B2 * | 9/2005 | Ward et al. | 700/121 |
| 7,200,671 | B1 * | 4/2007 | Lev-Ami et al. | 709/232 |
| 2005/0159911 | A1 * | 7/2005 | Funk et al. | 702/104 |
| 2005/0171627 | A1 * | 8/2005 | Funk et al. | 700/121 |

* cited by examiner

*Primary Examiner*—Ryan A. Jarrett
*Assistant Examiner*—Douglas S Lee
(74) *Attorney, Agent, or Firm*—Haynes, Beffel & Wolfeld LLP

(57) ABSTRACT

An aspect of the present invention includes a method and device for listening to communications between processes and tools, recording report and report trigger definitions, matching reports from tools with the recorded definitions, and translating messages into a context-insensitive format. Other aspects of the present invention include dynamically enhancing tool status reports, migrating processes form tool control hosts to distributed processors, and screening requests for tool status information from hosts and distributed processors. More detailed descriptions of aspects of the present invention are described in the claims, specification and drawings.

25 Claims, 5 Drawing Sheets

METHOD AND APPARATUS FOR MONITORING HOST TO TOOL COMMUNICATIONS

RELATED APPLICATION DATA

The present application is a divisional of U.S. patent application Ser. No. 09/935,213, as amended, entitled METHOD AND APPARATUS FOR MONITORING HOST TO TOOL COMMUNICATIONS, filed 22 Aug. 2001, invented by Uzi Lev-Ami and Yossef Ilan Reich, which is a continuation-in-part of U.S. patent application Ser. No. 09/847,937, entitled METHOD AND APPARATUS FOR TWO PHASE STRUCTURED MESSAGE TO TAGGED MESSAGE TRANSLATION, filed 2 May 2001, invented by Uzi Lev-Ami, Tal Lev-Ami, Ezra Shabi and Yoav Sherf; and claims the benefit of U.S. Provisional Patent Application No. 60/227,408, entitled WEB BASED TOOL CONTROL, filed 23 Aug. 2000, invented by Mitchell Weiss, Uzi Levi-Ami, and Yossi Reich. Such applications are incorporated by reference as if fully set forth herein.

BACKGROUND OF THE INVENTION

The protocols, communication infrastructure and hosting modes used by tools and other automated or semi-automated equipment in semi conductor fabs and foundries, metal cutting shops, healthcare and other domains developed over the years, when communication and processor speeds were relatively limited. Message protocols for foundry, shop floor and healthcare applications were designed to utilize low-speed, serial communications. These message protocols included structured messages, which could be transmitted quickly even with low-speed communications. Structured messages were and remain difficult to translate and understand. The difficulty is exacerbated when a first message sets a context for a response and a second, responsive message does not repeat the context; that is, the context-sensitive response is only meaningful when paired with the corresponding context-setting message. Matching context-setting and context-sensitive messages can be a very tedious task, especially when the context-setting-messages precede the context-setting messages by hours, days or weeks, instead of immediately preceding the responsive messages. The communication infrastructure may utilize serial communications or a bus structure, compliant with SECS or CAN+. Hosts are centralized, monolithic programs that are difficult to modify.

Therefore, it is desirable to introduce methods and devices for improved communications between tools and processes requiring information from tools and other automated or semi-automated equipment.

SUMMARY OF THE INVENTION

An aspect of the present invention includes a method and device for listening to communications between processes and tools, recording report and report trigger definitions, matching reports from tools with the recorded definitions, and translating messages into a context-insensitive format. Other aspects of the present invention include dynamically enhancing tool status reports, migrating processes form tool control hosts to distributed processors, and screening requests for tool status information from hosts and distributed processors. More detailed descriptions of aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
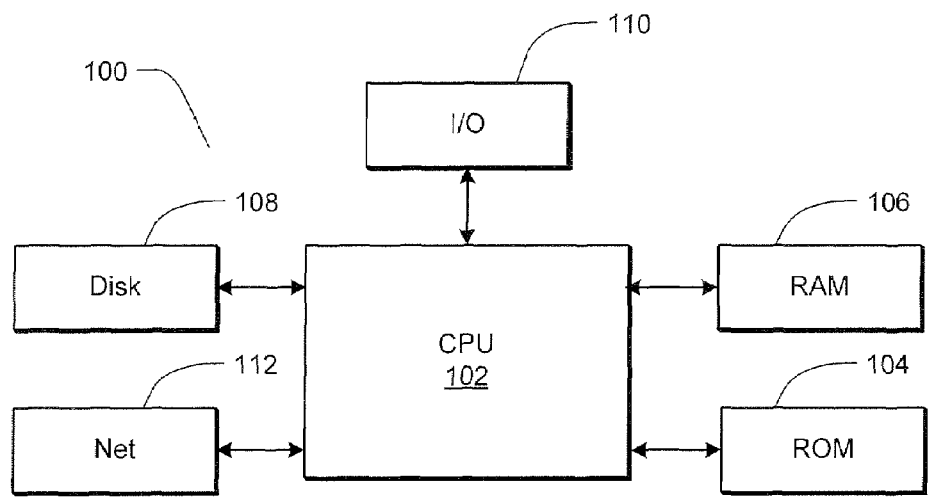
FIG. 1 is a block diagram of a system used to demonstrate aspects of the present invention.

FIG. 1 is a block diagram of a general-purpose computer 100 which may be used to practice aspects in the present invention. The computer includes a CPU 102, which can read from a read only memory 104, which can read from and write to a random access memory 106, which can read from or write to a disk storage system 108, which can communicate across a network connection 112, and which can receive and send data via input output ports 110. Programs and routines may be stored on the disk storage, not depicted, either a fixed or removable disk, be read into random access memory 106 and be executed on the CPU 102. The output of a routine running on the CPU may be input to a subsequent routine. The output of a routine may be data stored in random access memory, data stored on the disk storage system, data communicated via network connection, or data communicated across the output port. Similarly, the output of one part of a routine running on the CPU may be input to a subsequent part of same routine.

Figure 2A:
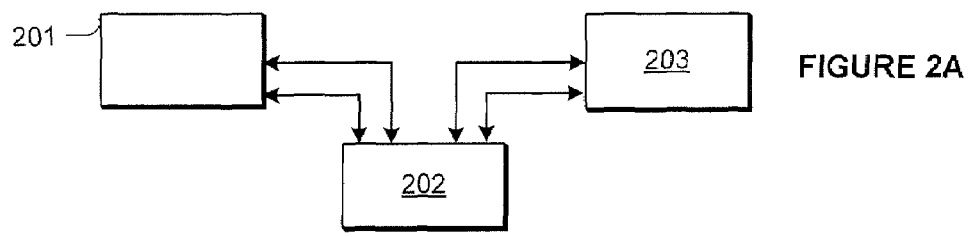
FIG. 2A-2D are block diagrams of configurations and modes for listening to communications among devices.
Figure 2B:
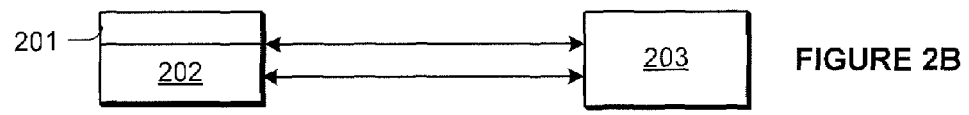
Figure 2C:
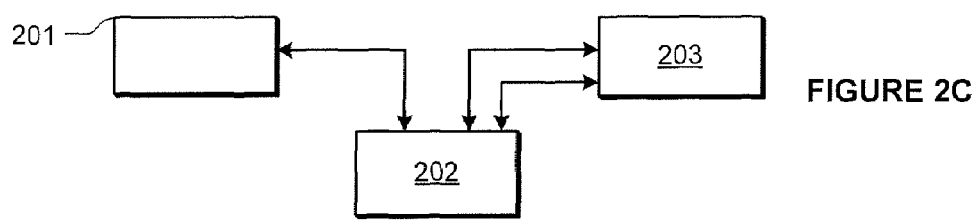
Figure 2D:
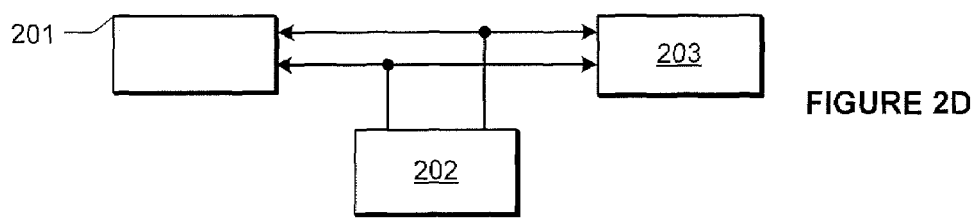

Some arrangements for practicing the present invention are illustrated in FIGS. 2A-2D. At least one machine 203 communicates with at least one host 201. The host may be a controller or a management system for one or more machines. The host may be centralized, distributed among processors, or centralized with some functions distributed among processors. Software implementing aspects of the present invention may run 202 on the host (FIG. 2B), on other equipment that listens to communications between the host and the machine (FIG. 2A), or on other equipment that has protocol translation capabilities (FIG. 2C). The equipment with translation capabilities may translate messages from a serial protocol to a network protocol or among other types of communication or transport protocols. For instance, it may translate from a CAN+ or IEC 62026 bus protocol to an Ethernet protocol. One description of CAN+ bus and other sensor/actuator bus (SAB) protocols appears in James R Moyne, Nader Najafi, Daniel Judd and Allen Stock, "*Analysis of SensorActuator Bus Interoperability Standard Alternatives for Semiconductor Manufacturing*", Sensor Expo Conference Proceedings (Sept. 1994). SAB protocols which may be used with the present invention include WorldFIP fieldbus, DeviceNet protocol, SDS, J-1939, LONWorks protocol, Seriplex protocol, ISP Fieldbus, and BITBUS, and the later, derivative or updated implementations of these protocols. Software implementing aspects of the present invention also may run on equipment that listens to communications between the host and the machine (FIG. 2D,) tapping into communications lines. In configurations 2A, 2C and 2D, the listening device is removable and distinct from either the host or tool. It can be added near the host or tool, or remote from either the host or tool. It functions independently of either the host or tool. When removed, it is reusable with another tool without physical alteration, with reprogramming or resetting. In configuration 2D, several types of couplings can be used to tap into the communication lines. A connector may be inserted into the lines. The tap lines leading out of the connector may be physically coupled to the communications lines, may be magnetically coupled or in any other way effective to split or replicate the signal in the communication lines. A hub with an extra port can supply access. Magnetic sensors may be placed proximate to the communications line to sense signals in the lines to provide magnetic coupling without inserting a connector or hub in the communications lines.

The communications between the host and machine include a series of structured messages, for instance untagged messages constructed according to a standard or protocol. These messages may include both context-setting and context-sensitive messages, which sometimes are inquiries and responses. Context-sensitive response messages may omit the inquiries to which they respond. For instance, a context-setting message may ask for read-outs of four variables that the machine monitors. The context-sensitive message may respond with read-out values for the four variables, without identifying the variables being reported. Alternatively, one or more context-setting messages may define at least one report and at least one report triggering event. The triggering event may be logical, such as when a process step is completed or an operating condition reaches a threshold, or it may be time-based, such as every two seconds during an etching process. When the machine senses occurrence of the triggering event or when the report is specifically requested, it may issue the report. The report may take the form of read-out values for a plurality of variables, without identifying the variables being reported.

The machines may be semiconductor manufacturing equipment in a clean room, numerically controlled equipment in a machine shop, or any other automated or semi-automated equipment. The machines may be standalones, machines connected by robot work piece handlers, or fully integrated multi-station work cells. Each machine may have its own controller or a plurality of machines may share a controller. Similarly, devices used for or in the business of healthcare may benefit from the present invention. These devices may be connected to patients or may store information regarding patients.

Communications may involve RS-232 serial communications, CAN or other bus communications, Ethernet connections or any other suitable communications or message transport layer. This invention may most benefit structured message protocols that were designed for slower, RS-232 serial communications or SAB communications, as such legacy protocols may often employ context-setting and context-sensitive messages. This invention also may apply to protocols that utilize context-insensitive messages.

Figure 3:
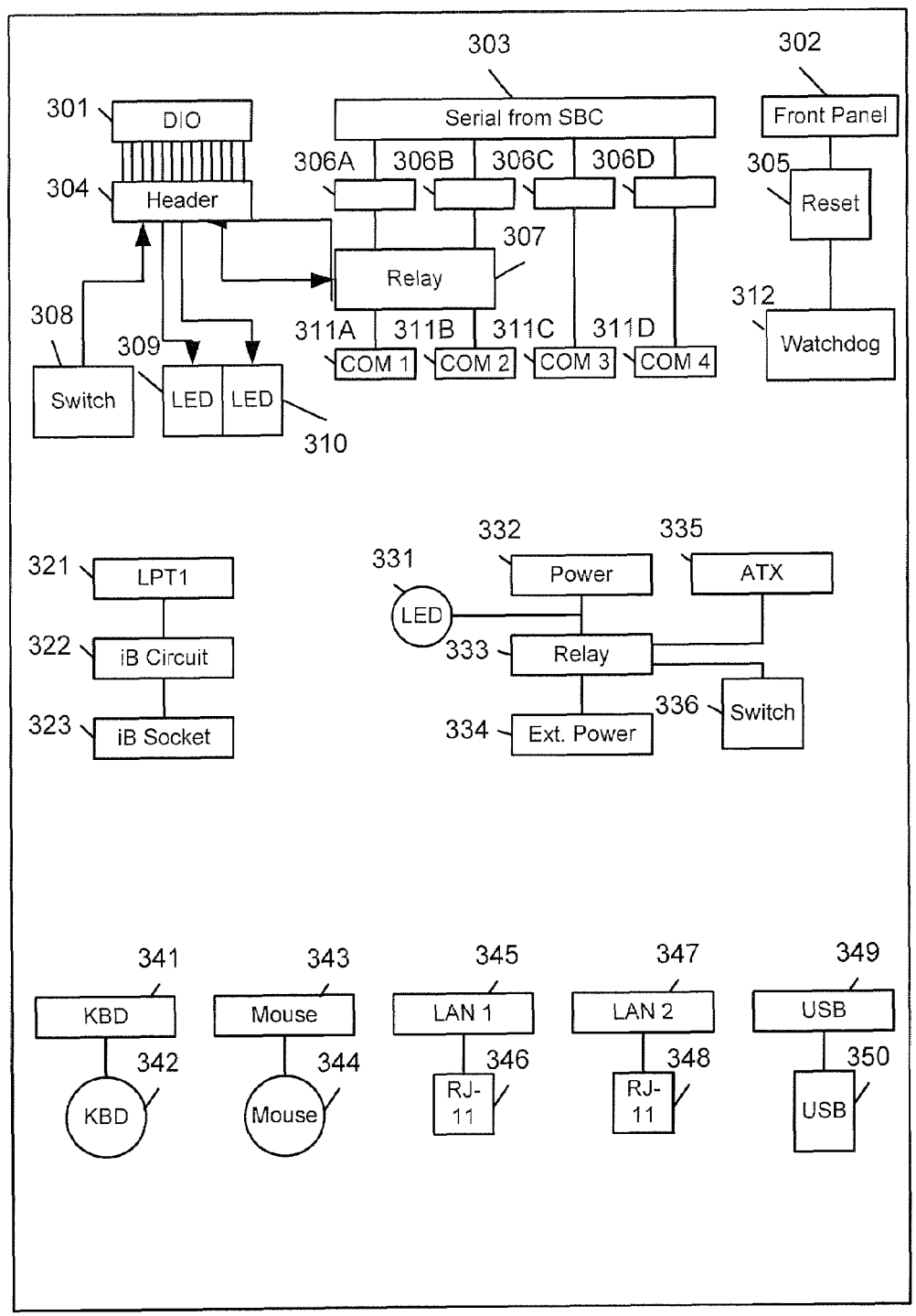
FIG. 3 is an interface block diagram.

Devices that can be used to implement aspects of the present invention include a variety of general-purpose computer systems. PRI Automation, Inc. produced one such eQonnector hardware. PRI's eQonnector was a fully functional x86 based computer running Windows NT without a keyboard or monitor. The system includes a variety of input output ports: 2 Ethernet connections for 10/100 base T connection; 2 isolated RS 232-c ports using DB-9 connectors; and one DeviceNet (CAN-compatible) interface using a DIN jack. The eQonnector further includes 128 MB of RAM, a 4 GB hard disk and a universal power supply. Its size is approximately 200 mm diameter (generally round) and 50 mm high. Another eQonnector is a generic computer system, a portion of which is depicted in an interface block diagram, FIG. 3. Two alternative Advantech single board computers ("SBC") that may be suitable are Advantech PCM-9550F and PCM-9572F. The latter SBC provides more capability to support advanced functions. An interface PCB provides functions not included on the SBC. The SBC and interface PCB are housed in a rectangular aluminum enclosure, constructed from standard extrusions provided by Parvus Corporation, with sheet metal end caps. The overall dimensions are 3.5" H×6.6" W×9" D. The hard disk is an IBM Travelstar DJSA-210 with a 10 GB capacity or larger. FIG. 3 depicts components of the interface PCB. Several connectors are provided for linking the interface PCB and the SBC. A digital input output connector 301 provides eight bits of digital input output, connected to the SBC. The digital input output connector 301 may be compatible with OPTO-22I/O module racks. The eight bits are allocated by the header 304. Bit seven is connected to the shutdown switch, for signaling the SBC to shut down. Bit 6 indicates whether the system is operating in eavesdrop or pass-through mode. This bit controls the connection relay 307. The default power off condition is for the device to be in eavesdrop mode. The connection relay 307 controls the configuration of the COM 1 and COM 2 port connectors, 311A & 311B. These ports are optically isolated from each other (306A & 306B) and from the monitored communications channel. The pin assignments in the eavesdrop and pass-through modes are:

| SBC Signal | Eavesdrop | Pass-Thru |
| --- | --- | --- |
| COM1 - Tx | N/c | DB9a - pin 3 |
| COM1 - Rx | DB9a - pin 2, DB9b - pin 3 | DB9a - pin 2 |
| COM1 - Gnd | DB9a - pin 5, DB9b - pin 5 | DB9a - pin 5 |
| COM2 - Tx | N/c | DB9b - pin 3 |
| COM2 - Rx | DB9b - pin 2, BD9a - pin 3 | DB9b - pin 2 |
| COM2 - Gnd | DB9b - pin 5, DB9a - pin 5 | DB9a - pin 5 |

Bits 4 and 5 control a two-bit display 309. Bits 0-3 control a four-bit display 310. The front panel connector 302 connects a reset switch 305 and a watchdog component 312. The serial connector 303 connects two to four COM ports 311A-311D to the SBC, through isolation devices 306A-306D, such as optical isolation devices or high impedance amplifiers. A parallel port connection from the SBC 321 is coupled to an iButton circuit 322. The iButton circuit supports a particular format of user mountable memory provided by Dallas Semiconductor, known as an iButton 323. In alternative embodiments, an EEPROM, EPROM or other non-volatile memory component could be used. The connections to the SBC for power 332 and ATX 335 supply and control power. An LED 331 indicates the power on status. A relay circuit 333 is responsive to the ATX signal from the SBC 335 and to the power switch 336.

It controls the feed of power from an external power source 334 to the power connector 332. Other interfaces mounted on the interface PCB board and connected to the SBC support a keyboard 341, 342, a mouse 343, 344, an Ethernet connection 345, 346 and a USB connection 349, 350. A second LAN Ethernet connection 347, 348, may supported by a Versalogic EPM-NET-100 PC/104-plus board. This board should be installed first in the PC/104 stack when it is used. An analog input board, Advantech PCM-3718H-A also may be used in some embodiments of the present invention. Analog support may provide 16 singled ended or 8 differential analog inputs. Analog inputs may have 12 bits of resolution or more. An expansion digital I/O board, the Advantech PCM-3724-A2 PC/104 board, may be used in conjunction with the present invention.

One communications protocol utilizing structured messages, including context-setting and context-sensitive messages, is a SEMI Equipment Communications Standard (SECS). Two aspects of this standard, SECS-I or HSMS for message transfer and SECS-II for message content are detailed in SEMI documents E4-0699, E37-0298, and E5-0600. The SECS-I standard defines a communication interface suitable for the exchange of messages between semiconductor processing equipment and a host. Semiconductor processing equipment includes equipment intended for wafer manufacturing, wafer processing, process measuring, assembly and packaging. A host is a computer or network of computers, which exchange information with the equipment to accomplish manufacturing. The SECS-I standard includes the description of the physical connector, signal levels, data rate and logical protocols required to exchange messages between the host and equipment over a serial point-to-point data path. This standard does not define the data contained within a message. The meaning of messages must be determined through some message content standard such as SEMI Equipment Communications Standard E5 (SECS-II). These standards provide a means for independent manufacturers to produce equipment and/or hosts, which can be connected without requiring specific knowledge of each other.

HSMS is intended as an alternative to SEMI E4 (SECS-I) for applications where higher speed communication is needed or when a simple point-to-point topology is insufficient. SEMI E4 (SECS-I) can still be used in applications where these and other attributes of HSMS are not required. HSMS is also intended as an alternative to SEMI E13 (SECS Message Services) for applications where TCP/IP is preferred over OSI. It is intended that HSMS be supplemented by subsidiary standards that further specify details of its use or impose restrictions on its use in particular application domains. High-Speed SECS Message Services (HSMS) defines a communication interface suitable for the exchange of messages between computers in a semiconductor factory.

The SEMI Equipment Communications Standard Part 2 (SECS-II) defines the details of the interpretation of messages exchanged between intelligent equipment and a host. This specification was developed in cooperation with the Japan Electronic Industry Development Association Committee 12 on Equipment Communications. It was indeed to be fully compatible with SEMI Equipment Communications Standard E4 (SECS-I). It is was intended to allow for compatibility with alternative message transfer protocols. This standard defines messages to such a level of detail that some consistent host software may be constructed with only minimal knowledge of individual equipment. The equipment, in turn, may be constructed with only minimal knowledge of the host. The messages defined in the standard support the most typical activities required for integrated circuit manufacturing. The standard also provides for the definition of equipment-specific messages to support those activities not covered by the standard messages. While certain activities can be handled by common software in the host, it is expected that equipment-specific host software may be required to support the full capabilities of the equipment. SECS-II gives form and meaning to messages exchanged between equipment and host using a message transfer protocol, such as SECS-I or HSMS. SECS-II defines the method of conveying information between equipment and host in the form of messages. These messages are organized into categories of activities, called streams, which contain specific messages, called functions. A request for information and the corresponding data transmission is an example of such an activity. SECS-II defines the structure of messages into entities called items and lists of items. This structure allows for a self-describing data format to guarantee proper interpretation of the message. The interchange of messages is governed by a set of rules for handling messages called the transaction protocol. The transaction protocol places some minimum requirements on any SECS-II implementation. SECS-II applies to equipment and hosts used in the manufacturing of semiconductor devices. Examples of the activities supported by the standard are: transfer of control programs, material movement information, measurement data, summarized test data, and alarms. A given piece of equipment will require only a subset of the functions described in this standard. The number of functions and the selection of functions will depend upon the equipment capabilities and requirements. The equipment typically will define the messages used in a particular implementation of SECS-II.

The structure of the SECS messages is detailed in standards documents sometimes referred to as E4-0699 and E5-0600. The following example illustrates at least part of the structure. The header structure is adapted from E4-0699 and the data structure from E5-0600. Additional structure may be provided, for instance by a transport layer. The processing of this structured message from binary through structure-tagged format to context-insensitive tagged format follows. Consider a so-called S1, F4 (or S1F4) message. This is the Selected Equipment Status Data (SSD) message. In this message, the equipment reports the status variable value (SV) corresponding to each status variable ID (SVID) requested in the order requested, for instance, requested by sending a S1, F3 Selected Equipment Status Request (SSR). An SVID may include any parameter that can be sampled in time such as temperature or quantity of a consumable. The host needs to remember the SVIDs requested, because they are not identified in the S1F4 response message. The SECS I/II structure specified in the standards resembles the binary portion of the following:

| | |
|---|---|
| 10000000 | "Reverse bit"=1 (equipment to host) |
| 00000000 | Device ID, e.g. ID=0 |
| 00000001 | Wait bit=0 (no response required), Stream=1 |
| 00000100 | Function 4 |
| 10000000 | End bit=1 (no blocks to follow) |
| 00000000 | Block 0 (only one block this message) |
| 00000000 | Four System Bytes, including source and transaction IDs |
| 00000010 | E.g., Source ID=2 |
| 00000000 | |
| 10000001 | Transaction ID=129 |
| 00000001 | List format |
| 00000011 | 3 Elements |
| 10110001 | Unsigned 4-byte integer next |
| 00000100 | Length 4 bytes |

-continued

| | |
|---|---|
| 00000000 00000000 | Most significant byte first |
| 00000001 11110100 | Value=500 |
| 01110001 | Signed 4-byte integer next |
| 00000100 | Length 4 bytes |
| 11111111 11111111 11111111 11111001 | Twos complement format Value= −7 |
| 00100001 | Binary unspecified value 1-byte next |
| 00000001 | Length 1 byte |
| 00000010 | Value=02 |

The entire message includes 17 bytes of data, 1-byte length (not shown), 10 bytes of header and 2 bytes checksum (not shown) for a total of 30 bytes. This short a message is quickly transmitted, even at a slow serial transmission rate such as 9600 baud.

One way of representing the data section of the binary message above, consistent with the list orientation of SECS-II, follows.

```
16:40:54 Received S1F4
   <L [3]
      <U4        500>
      <I4        −7>
      <B         02>
   >
```

Parsing this representation, a time stamp indicates when the message was received. This time stamp can be extracted from the transport layer, can be included by the sender at the application layer, or added by the receiving or logging facility. "L [3]" indicates a list of three elements. The <elements> include a data format followed by a value. This message representation is closed with a ">" and a final ".". This message is context-sensitive. It cannot be understood without knowing the inquiry that prompted the response, because it does not identify the SVIDs for which SVs are being reported.

The data portion of a context-setting messaging, which could be used to prompt the response above, can be represented as:

```
16:40:53 Sending S1F3
   <L [3]
      <U4        61>
      <U4        62>
      <U4        63>
   >
```

The host sent or the listening equipment received this query message at the time indicated, shortly before the S1F4 response. The host requested reports on variables identified as 61, 62, and 63. The message header included an identifier, which is not shown here, to be repeated back with the S1F4 response, to facilitate matching of the inquiry and response. One potential matching field would be a source ID plus a time stamp. If the device ID in the header were unique, then a time stamp alone would suffice. Another potential matching field would be a host identifier plus a sequence or transaction ID number. Matching the S1F3 and S1F4 messages of this example permits construction of a context-insensitive message, which identifies the variables (SVIDs) requested and the responses (SVs), as further illustrated below. Another example of context-setting and context-sensitive messages is a sequence used to define a report, define report triggering events, and deliver a defined report after a triggering event has been sensed. Details of these messages are given in the E5-0600 document.

```
11:58:46 : Sending S2F33 [define a report]
   <L [2]
      <U4      1>
      <L [1]
         <L [2]
            <U4      7>     [report #7]
            <  L [1]
               <U4   1>     [reports one variable, #1]
            >
         >
      >
   >

11:58:46   : Received S2F34 [acknowledgement of S2F33]
   <B 00>

12:01:12   : Sending S2F35 [define link event for triggering a report]
   <L [2]
      <U4      1>
      <L [1]                [one event trigger in this link definition]
         <L [2]
            <U4    1>       [event #1 is the trigger]
            <L [1]
               <U4   7>     [report #7 is triggered]
            >
         >
      >
   >

12:01:12 : Received S2F36 [acknowledgement of S2F35]
   <B 00>

12:15:26 : Sending S2F37 [enabling event report]
   <L [2]
      <BOOL T>
      <L [0]
      >
   >

12:15:27 : Received S2F38 [acknowledgement of S2F37]
   <B 00>

12:02:36 : Sending S6F19 [individual report request, alternative to event happening]
   <U4      7>           [report #7 requested]

12:02:37 : Received S6F20 [individual report data, responsive to S6F19]
   <L [1]
      <U4      2>        [report #7 issued (it is the value of variable #1)]
   >

12:15:39 : Received S6F11 [event report sent from tool, as defined in S2F33/35]
   <L [3]
      <U4      1>
      <U4      1>        [event #1 occurred]
         <L [1]          [one report triggered]
            <L [2]
               <U4   7>  [report #7 issued]
               <L [1]
                  <U4  3>  [reported value (of variable #1) is 3]
               >
            >
         >
      >
   >

12:15:39 : Sending S6F12 [acknowledgement of S2F11]
   <B 00>
```

In this sequence, it is useful to track the S2F37/38 pair. Logic may be included to flag, on a time-out or other basis, when a report has been defined but not enabled. The S2F37 message also illustrates reporting the message exactly, without eliminating unused fields. The S2F37 message structure specifies a list of two second level lists. One of the second level lists has no elements. This detail of the original S2F37 message is represented without modification. For some structured messages, the translation from structured to structure tagged message could include simplification of messages such as this S2F37 message.

One aspect of the present invention includes a desired format for structure tagged messages. This embodiment uses XML rules for tagging messages to represent their structure. Structure tagged messages compliant with XML can be processed using XML tools, which are available in variety. In this embodiment, an XML message may include a header with: a name field in the SECS II stream and function ("SxFy") format; a wait bit, indicating whether the recipient of the message is expected to acknowledge receipt (0 for off, 1 for on); a source ID, identifying the port that received the incoming message, or, alternatively, identifying the device that sent the message; transaction ID, identifying an open communication transaction, used for matching a response to an inquiry; and an optional header only flag, used if there is no data other than the header. The XML message further may include data, in a tree-type structure. Data nodes include a format conforming to one of the SECS-II format types, a length, and a data value.

Continuing with our examples, the following structure tagged messages are generated by processing the structured messages.

```
<Message Name="S1F4" Wbit="0" SourceID="2" TransactionID="129">
    <Structure Format="L" Length="3">
        <Value Format="U4" Length="1">500</Value>
        <Value Format="I4" Length="1">-7</Value>
        <Value Format="B" Length="1">02</Value>
    </Structure>
</Message>
<Message Name="S1F3" Wbit="1" SourceID="1" TransactionID="129">
    <Structure Format="L" Length="3">
        <Value Format="U4" Length="1">61</Value>
        <Value Format="U4" Length="1">62</Value>
        <Value Format="U4" Length="1">63</Value>
    </Structure>
</Message>
<Message Name="S2F33" Wbit="1" SourceID="1" TransactionID="257">
    <Structure Format="L" Length="2">
        <Value Format="U4" Length="1">1</Value>
        <Value Format="L" Length="1">
            <Value Format="L" Length="2">
                <Value Format="U4" Length="1">7</Value>
                <Value Format="L" Length="1">
                    <Value Format="U4" Length="1">1</Value>
                </Value>
            </Value>
        </Value>
    </Structure>
</Message>
<Message Name="S6F11" Wbit="1" SourceID="2" TransactionID="194">
    <Structure Format="L" Length="3">
        <Value Format="U4" Length="1">1</Value>
        <Value Format="U4" Length="1">1</Value>
        <Value Format="L" Length="1">
            <Value Format="L" Length="2">
                <Value Format="U4" Length="1">7</Value>
                <Value Format="L" Length="1">
                    <Value Format="U4" Length="1">3</Value>
                </Value>
            </Value>
        </Value>
```

-continued

```
        </Value>
    </Value>
    </Structure>
</Message>
```

As these tagged messages are in XML format, those skilled in the art will be able to understand the examples without a detailed explanation.

Information from the messages themselves, both the context-setting and the context-sensitive messages, can be combined with information retrieved from a dictionary or other reference external to the translation code. A tool compliant with the SECS standards should maintain a dictionary for providing information about system variables, equipment constants, data variables, collected event IDs and alarm IDs supported by the tool. In this context, system variables describe the status of the machine. Equipment constants are user modifiable operating parameters. Data variables are measurements of process conditions at the tool or machine. Collected event IDs describe triggers for reporting conditions. Alarm IDs describe triggers for alarms. Part of the information that may be maintained in the dictionary for these items is summarized in the table below.

| Item | ID | Name | Class | Format/Type | Min | Max | Default | Units | Desc |
|---|---|---|---|---|---|---|---|---|---|
| SV | ✓ | ✓ | ✓ | ✓ | N/A | N/A | N/A | ✓ | opt |
| EC | ✓ | ✓ | ✓ | ✓ | ✓ | ✓ | ✓ | ✓ | opt |
| DV | ✓ | ✓ | ✓ | ✓ | N/A | N/A | N/A | ✓ | opt |
| CEID | ✓ | opt | N/A | N/A | N/A | N/A | N/A | N/A | opt |
| ALID | ✓ | ✓ | N/A | ✓ | N/A | N/A | N/A | N/A | opt |

The potential categories of information are similar for system variables, equipment constants and data variables. An ID is a unique number typically used to access any of these three types of variables. A unique name may be assigned. The class distinguishes among variable classes (system variable, equipment constant or data variable.) The format or type is one of a set of standard formats for reporting a value. Data type and field length are part of a standard format. A standard format also may include the number of values associated with the variable, as some variables may have more than one value. For some variables, minimum values, maximum values, default values, units and extended description may be provided. The potential categories of information for events and alarms include an ID, a name and an optional description. The ID may be a sequential number. (In a broader context, variable may refer to any type of data regarding the status of a tool or any type of stored data, such as an inventory of patent MRI scans.)

It is useful in creating a dictionary to verify the correct format, type and structure of information reported by a particular machine, as machines may be less than perfectly compliant with standards. It is also useful in creating a dictionary to combine automatic inquiries to the machine with manual insertion of data in the file, especially in instances where the machine does not provide a list of variables, the machine provides only a partial list of rebels, or list provided is not compliant with a standard.

Sample dictionary entries relevant to these examples are:

| | | |
|---|---|---|
| 61: | Name | SV_1 |
| | Format | U4 |
| | Length | 1 |
| | Descriptor | |
| | Min | N/A |
| | Max | N/A |
| | Def | N/A |
| | Description | Describe this variable here |
| | Units | N/A |
| | Class | SV |
| 62: | Name | SV_2 |
| | Format | I4 |
| | Length | 1 |
| | Descriptor | |
| | Min | N/A |
| | Max | N/A |
| | Def | N/A |
| | Description | Describe this variable here |

-continued

| | | |
|---|---|---|
| | Units | N/A |
| | Class | SV |
| 63: | Name | SV_3 |
| | Format | B |
| | Length | 1 |
| | Descriptor | |
| | Min | N/A |
| | Max | N/A |
| | Def | N/A |
| | Description | Describe this variable here |
| | Units | N/A |
| | Class | SV |

A further aspect of the present invention includes a desired format for context tagged messages. This embodiment uses XML rules for tagging messages to represent their structure. Each tagged message includes the two branches described in the table below:

| Branch Name | Field Name | Explanation |
|---|---|---|
| Header | FormType | One of the forms: Data Form, Definition Form, Only Log Form and Time Form |
| | SECSMsg | Stream and function of the message |
| | Descriptor | Subtype of specific Form Type |
| | Descriptor Status | Status related to specific descriptor |
| | ID | Identification related to specific descriptor |
| | IsError | Indication (true/false) whether the message contains an error indication. Messages containing an error indication (true) are only logged and their data is ignored |
| DBLogInfo | Identifier | A unique tag for database data insertion and retrieval |
| | Timestamp | The time at which the primary message related to the transaction was received. |
| | TimeFolding Ind | A time folding indication |
| | Duration | The duration (in seconds) between the primary and secondary messages related to a transaction |
| | Parameter | For future use |
| | Status type | The type of the status related to the message |
| | Status value | One of the values acceptable for the specific status type |
| | Description | Free text used in several messages for additional indications |

In addition to the Header and DBLogInfo branches described above, messages of a data or definition form can have additional branches, as described below:

| Form Name | Branch Name | Field Name | Explanation |
|---|---|---|---|
| Data | Variable | Name | Variable name |
| | | Variable ID | VID |
| | | Report ID | Report identification |
| | | Value | (See following branch) |
| | Value (sub-branch of Variable) | Name | Name of the item |
| | | Format | SECS format |
| | | Length | Number of items length = 1 means it's a leaf with data length > 1 means it's a branch itself that contains array or a list of values (in a recursive manner) |

-continued

| Form Name | Branch Name | Field Name | Explanation |
|---|---|---|---|
| Definition | Delete Report | Report ID | The identification of the deleted report |
| | Delete Trace | Trace ID | The identification of the deleted trace |
| | Delete Event Link | Event ID | The identification of the deleted event |
| | Define Report | Report ID | The identification of the defined report |
| | | Variable | Actually a branch(es) that holds a VID |
| | Define Trace | Trace ID | The identification of the defined trace |
| | | Variable | Actually a branch(es) that holds a VID |
| | Define Event Link | Event ID | The identification of the linked event |
| | | Variable | Actually a branch(es) that holds report ID |
| | Delete All Reports | | No parameters |
| | Delete All Traces | | No parameters |
| | Delete All Event Links | | No parameters |

Continuing with some of the examples above, the process of matching context-setting and context-sensitive messages and expanding them against the dictionary produces the following:

```
<SECSMessage>
  <Header ID="#" IsError="false" SECSMsg="S1F3"
  FormType="Data Form"
  Descriptor="QuerySimple" DescriptorState="#"/>
  <DBLogInfo Duration="0" Parameter="#" TimeStamp="14-Feb-2001
  16:40:36" Identifier="3726866688" StatusType="#" Description="#"
  StatusValue="#" TimeFoldingInd="false"/>
    <Variable Name="SV_1" VariableID="61">
      <Value Name="SV_1" Format="U4" Length="1">500</Value>
    </Variable>
    <Variable Name="SV_2" VariableID="62">
      <Value Name="SV_2" Format="I4" Length="1">-7</Value>
    </Variable>
    <Variable Name="SV_3" VariableID="63">
      <Value Name="SV_3" Format="B" Length="1">02</Value>
    </Variable>
</SECSMessage>
<SECSMessage>
  <Header ID="#" IsError="false" SECSMsg="S2F33"
  FormType="DefinitionForm" Descriptor="Change"
  DescriptorState="#"/>
  <DBLogInfo Duration="0" Parameter="#" TimeStamp="05-Mar-2001
  11:58:46" Identifier="3889340592" StatusType="DRACK"
  Description="Ack: Accept" StatusValue="00"
  TimeFoldingInd="false"/>
    <DefineReport MapperID="7">
      <Link LinkID="1"/>
    </DefineReport>
</SECSMessage>
<SECSMessage>
  <Header ID="1" IsError="false" SECSMsg="S6F11"
  FormType="DataForm" Descriptor="GotEvent" DescriptorState="#"/>
  <DBLogInfo Duration="#" Parameter="#" TimeStamp="05-Mar-2001
  12:15:38" Identifier="3889340598" StatusType="#" Description="#"
  StatusValue="#" TimeFoldingInd="false"/>
    <Variable Name="V1" ReportID="7" VariableID="1">
    <Value Name="V1" Format="U4" Length="1">3</Value>
    </Variable>
</SECSMessage>
```

In these examples, the "Time Folding Ind" is used to flag a discontinuity in time, such as a shift out of daylight savings time, which could make a response appear to precede a query. The "#" symbol is a filler or null value.

The process of converting structured messages into structure tagged messages is straight forward. A very short routine can accomplish the conversion. Optionally, error checking can be added to the conversion process and the routine expanded. However, standard tools can be applied to error checking, including format checking and data validation, if the checking is postponed until the structured messages are fully translated into context tagged XML messages.

Figure 4:
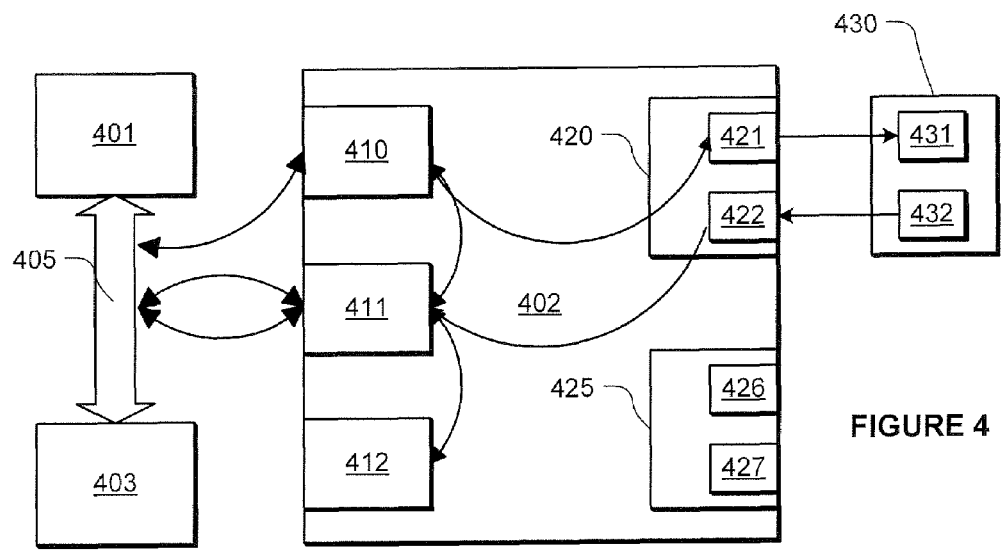
FIG. 4 is a block diagram including a device for listening to and translating communications between devices.

The process of converting structure tagged messages into context tagged messages is more involved. Context can come from context-setting messages or from context tables, which may be constructed from context-setting messages or the results of context-setting messages, e.g., values received by the machines in context-setting messages, stored by the machines and revealed in response to inquires. Additional useful information can come from dictionaries. FIGS. 3 and 4 illustrate converting structured messages into structure tagged messages.

FIG. 4 depicts a host 401 and a machine 403 in communication across media 405. The media may support serial communications, an Ethernet link or any other suitable method for communicating between host and machine. The communications protocol across the media may be SECS I, HSMS, CAN or any other suitable transport protocol, including those listed above. The system 402 taps into the communication media 405, for instance, in one out of the ways depicted in FIGS. 2A-2D. When the mode depicted in FIG. 2C is used, for instance, both an HSMS and SECS I session will be open. Logic and resources are provided for mapping messages from one transport format to another and, optionally, to keep two sessions open at the same time. The system 402 includes physical ports 410, 411, 412 and logical ports 420, 425. The physical ports may handle different modes of communication. For instance, a pair of physical ports may handle serial communications and another may handle Ethernet communications. The physical ports 410, 411, 412 may be connected with logical ports, e.g., 420. There may be a plurality of logical ports 420, 425. A logical ports may support bidirectional translation from structured to structure tagged to context tagged messages, and back again. In this illustration, translation from structured to context tagged messages is illustrated by blocks 421 & 426. Reverse translation is illustrated by blocks 422 & 427. Alternatively, separate logical ports could be assigned for the different directions of translation. The system may usefully provide translation only from SECS to a context tagged format. Error checking capabilities may be provided, if desired. Failures in the communication layer may be reported to a logger. In addition, an error message may be sent to the receiver. Translations may be communicated to an observer 430, for instance, using SOAP (Simple Object Access Protocol.) The observer may have separate facilities for receiving context tagged messages 431, translated from a structured message by translator 421, and for sending a structure tagged message is 432 to be translated by translator 422. The translation process is illustrated in greater detail in the following figure.

Figure 5:
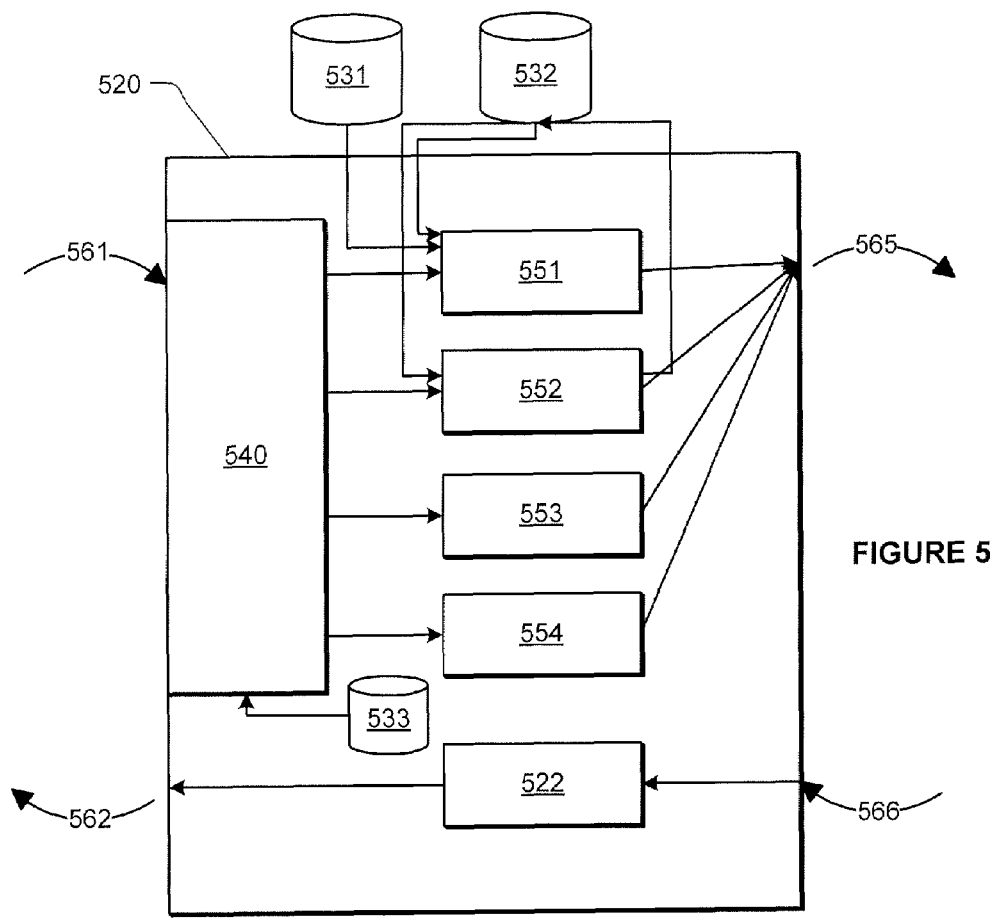
FIG. 5 is a block diagram of the second phase of a two-phase translation process.

FIG. 5 depicts the second phase of translation to and from context tagged message format. Structure tagged messages 561 are processed by the system 520 to produce context tagged messages 565. Conversely, context tagged messages 566 are translated by module 522 into structure tagged messages 562. One or more common logic modules 540 process an incoming structure tagged message. (Not illustrated in the figure is the first phase of translation, in which a structured message is translated into structure tagged message.)

In the second phase of translation, a number of steps may be carried out which do not depend on the form of message received. The resources available for processing incoming messages include the dictionary 531, a dynamic mapper 532, and various tables 533. The dictionary is described above.

The dynamic mapper records definitions of reports (links to variables), of traces (links to variables) and of events (links to reports or to datasets.)

```
<FormMappers>
    <Reports>
        ...
        <Mapper MapperID="7">
            <Link LinkID="1"/>
        </Mapper>
    </Reports>
    <EventLinks>
        <Mapper MapperID="1">
            <Link LinkID="7"/>
            <Link LinkID="2"/>
        </Mapper>
        <Mapper MapperID="10">
            <Link LinkID="11"/>
        </Mapper>
        <Mapper MapperID="11">
            <Link LinkID="12"/>
        </Mapper>
    </EventLinks>
    ...
</FormMappers>
```

Reports and EventLinks provide 1 to many connections, between reports and variables and between events and reports, respectively. In this example, report 7 is linked to variable 1 and event 1 is linked to reports 7 and 2. Event 1 is set to trigger report 7 including variable 1 and report 2 which is not defined in the excerpt shown.

The tables include a primary/secondary table, a name cross reference table and a message format table. One of the tables can be used to relate primary and secondary messages as illustrated by the following primary/secondary table excerpt:

| Session | | Ack | Empty List |
|---|---|---|---|
| Primary | Secondary | | |
| Data Form Sessions | | | |
| S1F3 | S1F4 | | ✓ |
| S2F13 | S2F14 | | ✓ |
| S2F15 | S2F16 | ✓ | |
| Definition Form Sessions | | | |
| S2F23 | S2F24 | ✓ | |
| S2F33 | S2F34 | ✓ | ✓ |
| S2F35 | S2F36 | ✓ | ✓ |

In this table, primary and secondary messages are associated with each other. The acknowledgment column marks the existence of an acknowledgment value that can be either a success or failure acknowledgment. The empty list column indicates a session that can include an empty variable list. In addition, a column can be provided which indicates that certain fields in the tagged message may be different from one session to another. Examples are provided for both data form sessions and definition form sessions. The data form sessions include an inquiry, which sets a context, and a response. The definition form sessions set contexts for later reporting, such as defining a report, an event, a trace or a data set. Additional session types include log only form sessions and time form sessions. The log only form sessions include messages that are not processed as data or definitions, but are only logged. The time form sessions include special messages which reflect resetting of the clock running on a machine. These messages are useful when the clock needs to be set back to be accurate or when hours are gained or lost due to daylight savings time.

Another useful table is a name cross-reference table. The name cross-reference table can be used to differentiate between message types that validly can originate with either a host or a machine. A combination of source, which is associated with either a host or machine, and message type can be translated into a differentiated message type. The entries below include one of our examples and an instance in which the handling of a message type (its mapper name or differentiated message type) depends on where it originated.

```
<Port PortID="1" PortType="Host">
    ...
    <Message Name="S7F3" MapperName="S7F3_H"
    MainDestPort="2">
        <DestPortID>0</DestPortID>
    </Message>
    ...
</Port>
<Port PortID="2" PortType="Equipment">
    ...
    <Message Name="S1F4" MapperName="S1F4"
    ReturnToSender="True">
        <DestPortID>0</DestPortID>
    </Message>
    ...
    <Message Name="S7F3" MapperName="S7F3_E"
    MainDestPort="1">
        <DestPortID>0</DestPortID>
    </Message>
    ...
</Port>
```

The mapping of the S7F3 message in this example depends on whether it originated with the host (S7F3_H) or the equipment (S7F3_E).

A third useful table is the message format table.

```
<Mapper Name="S1F4" Reply="false" WaitForAck="false"
FormType="DataForm" Descriptor="QuerySimpleReply"
TransactionInfo="Reply">
   <Structure Format="L" KnownLength="false"
   ZeroAction="CutMessage">
      <Value Format="Unknown" SpecialItem="Variable"
      Duplicated="true"/>
   </Structure>
</Mapper>
<Mapper Name="S6F11" Reply="Optional" WaitForAck="false"
FormType="DataForm" Descriptor="GotEvent"
TransactionInfo="CreateDoc">
      <Structure Format="L" KnownLength="true" Length="3">
         <Value IrrelevantItem="true"/>
      <Value Format="DataItem" Type="CEID" SpecialItem="EventID"
      TagID="ID"/>
      <Value Format="L" KnownLength="false"
      ZeroAction="NoReportLink"
      SpecialItem="Event">
         <Value Format="L" KnownLength="true" Length="2"
         Duplicated="true">
            <Value Format="DataItem" Type="RPTID"
            SpecialItem="ReportID"/>
            <Value Format="L" KnownLength="false"
            SpecialItem="Report">
               <Value Format="Unknown" Duplicated="true"
               SpecialItem="Variable"/>
            </Value>
         </Value>
      </Value>
   </Structure>
</Mapper>
```

Two useful tools for manipulating data structures used during the second phase of translation are with document object model (DOM) tools and the C++ standard template library (STL). Those of ordinary skill in the art will recognize that many other ways of manipulating data structures are substantially equivalent: for instance, SAX (Simple API for XML) has a different origin than DOM, but is substantially equivalent to DOM. DOM is a platform- and language-neutral interface that permits script to access and update the content, structure, and style of a document. It includes an application programming interface (API) for well-formed XML documents. It defines the logical structure of documents and ways that a document can be accessed and manipulated. In the DOM specification, the term "document" is used in a broad sense. Increasingly, XML is being used as a way of representing many different kinds of information that may be stored in diverse systems, and much of this would traditionally be seen as data rather than as documents. Nevertheless, XML presents this data as documents, and the DOM may be used to manage this data. The DOM interface enables those practicing aspects of the present invention to build documents, navigate their structure, and add, modify, or delete elements and content. Tools for practicing DOM are provided by Microsoft and others.

The Standard Template Library, or STL, is a C++ library of container classes, algorithms, and iterators; it provides many of the basic algorithms and data structures of computer science. The STL is a generic library, having components that are heavily parameterized: almost every component in the STL is a template. Other data manipulation libraries will be equivalent to STL; many of them are extensions of STL provided by various vendors. DOM and STL can be mixed and matched. For instance, the dictionary and message format table could be implemented using DOM, leaving the name cross reference table and the dynamic mapper to be implemented using STL.

The second phase translation steps may be traced from when an input buffer is filled with a structure tagged message 561. (Not all of these steps will be needed to practice the present invention.) Some steps are followed regardless of the so-called "form" of the structure tagged message 540. The incoming message is identified as a primary or secondary message, using the primary/secondary table or some other data structure. A primary message is given a timestamp and unique identifier, both of which are useful if the context tagged messages are stored in a database. A secondary message is associated with a previously received primary message. A transaction ID or similar matching field can be used to match the secondary message with its primary message. The incoming structure tagged message is translated from XML into a DOM tree. The SECS-II message name is retrieved from the tree. This message name and the source of the message are used to access the name cross-reference table, to find a differentiated message name. The differentiated message name is used to locate the appropriate message format entry in the message format table. The appropriate message format entry includes a form type, such as data form or definition form, which can be used to control processing in addition to the steps common to all form types. Again for a secondary message, a primary message structure is stored for the session closing secondary message. The message format entry is used to parse the incoming structure tagged message. The structures of these two data structures can be matched. At this stage, the incoming message may be classified as a publishable context tagged message. For instance, a primary message with no wait bit (requesting an acknowledgement) or a primary message with a meaningless acknowledgement (e.g., S6F11) or with a secondary message may be a candidate for publication.

Processing beyond the common steps 540 proceeds according to the form type of the incoming message. Separate modules or segments of logic may process data forms 551, definition forms 552, log only forms 553 and time forms 554, before publishing a context tagged message 565.

The equipment, data structures and program steps described above can be combined with other components in a variety of useful embodiments. In one embodiment, a removable listening device is provided to monitor a wired communications channel between one or more tool hosts and one or more tools. The listening device is passive. It optionally may have a standard isolation device to protect the communications channel from noise generated by the listening device. This isolation device may be an optical isolator, a high impedance amplifier or any other components that effectively isolate the wired communications channel from the listening device. The wired communications channel may be an RS 232 or CAN-compliant channel, or it may be any of the communications channels previously mentioned. It alternatively may be a less commonly used communications channel such as RS422, USB, Firewire, Apple APB, Appletalk, or Ethernet. The listening device records report definitions and report trigger definitions sent by the tool hosts to the tools. This recording of report and report trigger definitions may take advantage of the data structures process steps described in detail above. The report definitions may be compliant with a SECS, HL7 or DIACOM standard. Structured messages in integrated circuit manufacturing fabs, metal cutting shops, general manufacturing, automotive manufacturing, healthcare facilities and many other environments can be processed in accordance with the present invention. The report trigger definitions similarly may be adapted to a variety of environments. Report trigger definitions may be based on or more process conditions or the passage of time.

Figure 6:
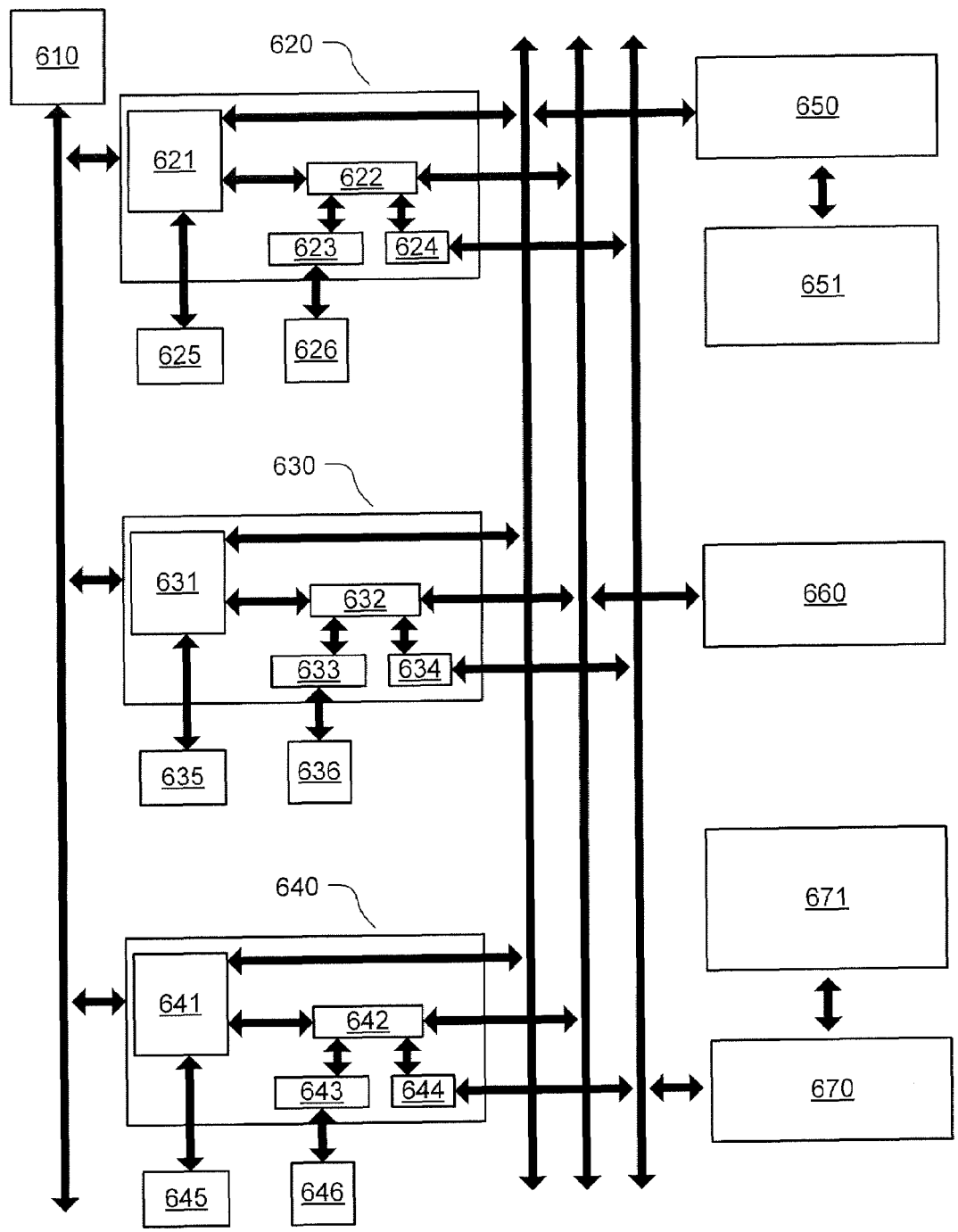
FIG. 6 is block diagram of a system with multiple removable listening devices, each communicating with a separate tool.

FIG. 6 depicts a system with multiple removable listening devices, each communicating with a separate tool. Removable listening devices 620, 630, and 640 communicate data with a host 610. The removable listening device 620 has a SECS-XML part 621, a tool data server 622, a hardware interface 623, and a web interface 624, which communicate data with each other. Similarly, the removable listening device 630 has a SECS-XML part 631, a tool data server 632, a hardware interface 633, and a web interface 634, which communicate data with each other; and the removable listening device 640 has a SECS-XML part 641, a tool data server 642, a hardware interface 643, and a web interface 644, which communicate data with each other.

The SECS-XML parts 621, 631, and 641 gather and translate data transferred between host 610 and the tool 625, the tool 635, and the tool 645, respectively. The data is stored in a database server 650, which is in communication with SECS-XML parts, 621, 631, and 641. The data is published through the COM based tool data servers 622, 632, and 642. The tool data servers 622, 632, and 642 collect data from miscellaneous other hardware 626, 636, and 646 respectively, via hardware interface 623, 633, and 643, respectively.

The SECS-XML parts 621, 631, and 641 convert the SECS II data into XML. SECS II uses an untagged data format. Therefore, the data is usable by transmitting and receiving devices that possess additional required and/or have established the "meaning" of the data in context of the current communication session. This data is converted into tagged XML format, rendering it accessible to a wide variety of clients, such as browser based client 671, which for example uses some combination of HTML pages, XML, and Java Beans. The SECS-XML parts 621, 631, and 641 convert data in the opposite direction, from XML to SECS II, for communication either with the host 610, or the tool 625, 635, or 645 respectively. The conversion is a multi-step process, in which the actual conversion is based upon a previously created, expandable infrastructure of dictionary/mappers. This infrastructure is created in a semi-automatic process, and enables quick and accurate acquisition of a new tool, such as tool 625, 635, or 645.

The database server 650 stores a database of the XML data. The database is commercial off-the-shelf software such as Oracle, 8i that allows storage of data received from the various tools, and retrieval of information by interested clients. Data can be filtered and analyzed to provide trends and various statistics. The database is designed to provide the capabilities of reliability, scalability, archiving, replication, and web connectivity.

The tool data servers 622, 632, and 642 provide real-time data for tools and applications to complement the database's capabilities of massive data storage and relatively slow response time. A tool data server uses dynamic software structures to maintain current system state data. Using a publish/subscribe data distribution model and well-documented public interfaces, the tool data server provides updates on specified variable changes to registered clients.

The hardware interface 623, 633, and 643 enable the removable listening device 620, 630, and 640 respectively to receive data from tools or tool components that are not monitored by SECS. In such case, a dedicated interface is created, using standard drivers (serial, parallel, DeviceNet). The data received from hardware 626, 636, and 646 is then manipulated like the data transmitted via SECS communication.

The web interface 624, 634, and 644 plugs into a COTS web server to enable external browser-based clients to selectively access and modify online data in the removable listening device's tool data server. The web interface provides tool data server access to HTML, XML, and beans browser-based clients. HTML pages are displayed on a standard browser or thin GUI, enabling quick and painless interfacing of any deployed tool. XML requires use of XSL to enable and control the display of XML on the client's browser. Beans, or Java applets downloaded to the client, enable presentation and animation of data from the tool. Beans can be extended to support any further manipulation of data on a specific tool, a group of tools, or data exchanged between tools for interoperability. The removable listening device is an equipment web server.

External clients access removable listening device data by means of generic tools, such as SQL, HTML, DCOM, XML, and Java. External client types that can be used have: database interfaces such as software applications using SQL or HTML, for example database interface 651 communicating via database server 650 with the SECS-XML parts 621, 631, and 641; application interfaces using DCOM such as application interface client 660 in communication with tool data server 622, 632, and 642; and browser-based clients such as browser-based clients 671 communicating via firewall 670 with web interface 624, 634, and 644. External clients use standard protocols to access the removable listening device, so standard commercial security solutions, such as firewalls, can be used. In addition, the removable listening device supports fine granularity definition of access control lists to achieve maximum security.

Figure 7:
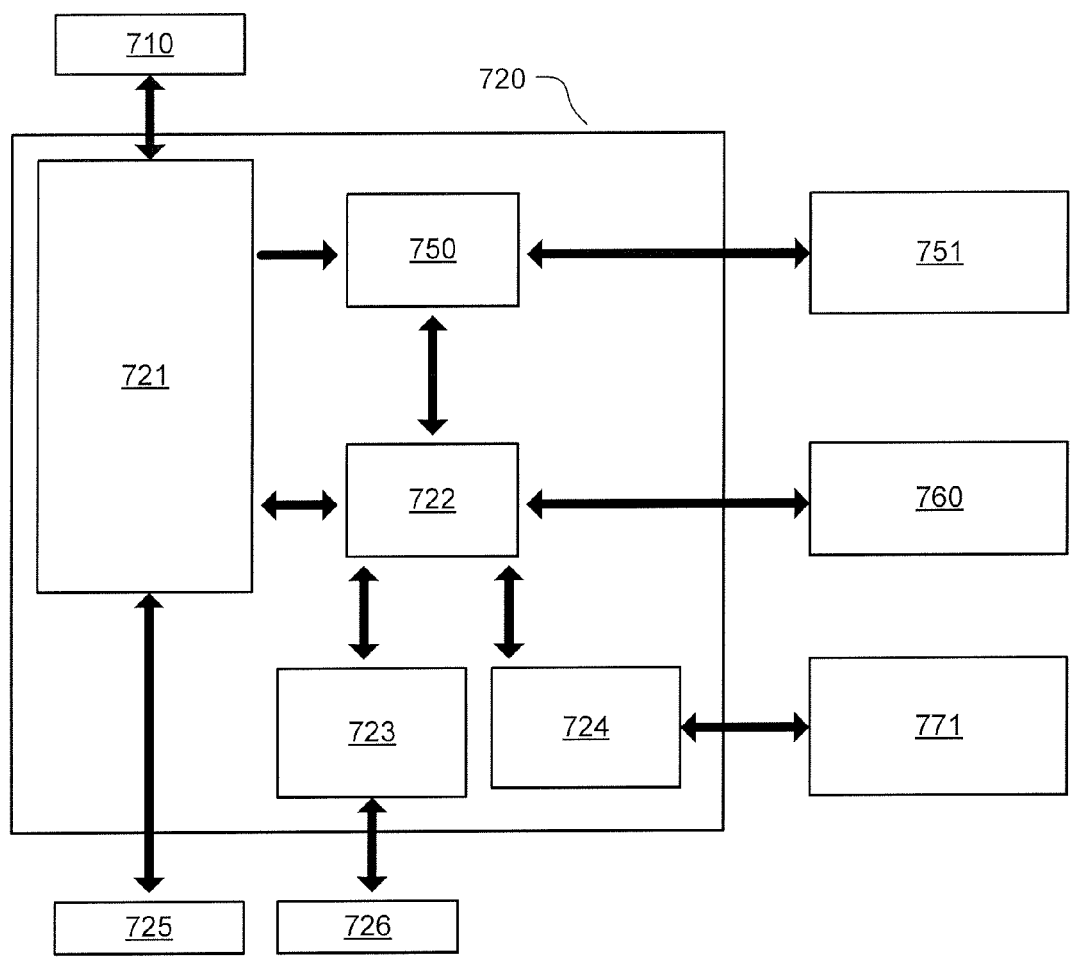
FIG. 7 is block diagram of a system with a removable listening device acting as a web server, database server, and application server.

FIG. 7 depicts a system with a removable listening device acting as a web server, database server, and application server. Removable listening device 720 is similar to removable listening devices 620, 630, and 640 of FIG. 6. Removable listening device 720 communicates data with a host 710. The removable listening device 720 has a SECS-XML part 721, a tool data server 722, a hardware interface 723, a web interface 724, and a database 750, which communicate data with each other. The SECS-XML part 721 communicates with tool 725. The hardware interface 723 communicates with miscellaneous hardware 726. The database 750 communicates with a database interface client 751. The tool data server 722 communicates with an application interface client 760. The web interface 724 communicates with a browser-based client 771.

The term tool host is used in a broad sense to include both tool control hosts and more limited or flexible distributed processors. Tool hosts include both hosts with comprehensive, integrated tool control functions and hosts that run on distributed processors with more limited, task-specific functions. Tool hosts include products such as Consilium's FAB300(™) software, which is described as providing a single comprehensive factory management system driven by a centralized definition of customer-specific business processes. This category of tool hosts is designed to replace traditional manufacturing execution systems, which are designed to control tools provided by different vendors. At the opposite end of the tool host spectrum from traditional manufacturing execution systems, component processes may be run on distributed processors to handle a variety of specific functions, without claiming to be comprehensive management systems. Along the spectrum, a product such as Consilium's FAB300(™) software may be considered a tool control host for some purposes and a process running on a distributed processor, for other purposes.

The listening device includes logic to match the first triggered report from the tools with the report and report trigger definitions in real-time. The listening device may finish generating a context-insensitive report based on the first triggered report before it assesses a second triggered report. Depending on the architecture of the processor and operating system included in the listening device, there may or may not be overlap between the beginning of processing a second triggered report and completion of processing a first triggered report. The generation of a context-insensitive report based on the first triggered report proceeds promptly. Alternatively, several reports could be queued for processing as a group within 1, 2, 5, 10, 15, 30 or any time less than or equal to 60 minutes. The outside time for batch processing should be 60 minutes, due to urgent data needs of most facilities utilizing the present invention. The first context-insensitive report is output. The output may be on a display terminal, to hardcopy, or to persistent memory such as a disk drive, an optical drive, a non-volatile memory, or a computer-output microfilm or microfiche. The output of the process may be in a field tagged format. This field tagged format may be XML, HTML, comma-separated values, or a standard or custom field tagged format. Alternatively, the context-insensitive report may be in a tabular format or a textual format.

Another embodiment of the present invention includes a method of dynamically annotating tool status reports. A removable listening device is provided to monitor wired communications between one or more tool hosts and one or more tools. The wired communication may take place on a channel using any of a wide variety of protocols. The listening device records report definitions and report trigger definitions sent by the tool hosts to the tools. Aspects of the report and report trigger definitions are described in the prior embodiment. The listening device matches a first triggered report from the tools with the report and report trigger definitions to generate a first context-insensitive report. The first and second triggered reports, in this embodiment, are not accompanied by report definitions or report trigger definitions, either in the form sent by the tool hosts or any other form. The triggered reports may identify the event or other cause of being triggered, without including report definitions or report trigger definitions. The listening device may match the first triggered report from the tools with the report and report trigger definitions in real-time. The listening device may finish generating a context-insensitive report based on the first triggered report before it assesses a second triggered report. Depending on the architecture of the processor and operating system included in the listening device, there may or may not be overlap between the beginning of processing a second triggered report and completion of processing a first triggered report. The generation of a context-insensitive report based on the first triggered report proceeds promptly, rather than been queued for batch processing of several reports as a group. The report and report trigger definitions may be compliant with a SECS protocol, a HL-7 protocol, a DIACOM protocol, a CANS-compliant protocol or any standard or custom protocol. The report trigger definitions may be based upon equipment status or on time periods that trigger reporting. This embodiment may further include outputting the first context insensitive report in a field tagged format. More generally, the output of this process may be to a machine or human-perceptible output media. The format may be as a report or data file, data file formats including structured formats and field tagged formats.

A further embodiment is a method of migrating one or more processes from a tool control host in communication with one or more tools to one or more distributed processors. In this embodiment, an intercept device is provided which screens requests for information from tools. The tool control host is the legacy controller. The distributed processors handle updated, most likely more flexible processes. The migration process allows the tool control host to remain in communication with the tools even as the distributed processors begin communication with the tools. The intercept device includes logic to retain tool status information from the tools and to retain pending requests for tool status from the tool control hosts. The tool status information may include state information, as well as values of variables. The requests for tool status information may be requests for specific variables, request for reports, or report and report trigger definitions which periodically generate triggered reports. In an alternative embodiment, for instance one adapted to quick response to requests, the logic would only need to retain tool status information and not pending requests. This embodiment involves moving one or more processes from the tool control hosts to one or more distributed processors. Another aspect of this embodiment is activating one or more processes on distributed processors which were not supported by the tool control hosts. These processes are activated on the distributed processors as an alternative to integrating them into the logic of the tool control hosts. Request from both the tool control hosts and the distributed processors are routed to the intercept device, instead of the tool. Intercept device satisfies request for tool status information using either retained information or by generating new requests to the tool. The retained information may be tool status information or it may be a pending request. The intercept device includes logic to avoid making duplicate requests for tool status information, if an incoming request duplicates a pending request. The output of this process may be to a machine or human-perceptible output media. The format may be as a report or data file, data file formats including structured formats and field tagged formats.

A further aspect of the present invention is that a listening or intercept device may monitor one or more events reported by the tools and identify retained tool status information that is rendered stale by the reported events. The device may include logic to expire the stale tool status information, such as by setting a flag or by erasing stale information.

A further aspect of the present invention is that the intercept device may monitor one or more events reported by the tools and determine when or whether collection of tool status information should be modified. For instance, when an event changes the state of the tool, sampling of variables may be increased or decreased. For instance, collection of data regarding the tool status may be reduced in between processing of work pieces. If a tool is operating a multi-step process, the intercept device may include logic request collection of values of different variables during different process steps.

Either the listening or intercept device may be programmed to modify tool status information, in certain circumstances. When tool status information is received from the tools, rules or translation tables may be supplied to modify reported values. The values of reported variables may be modified as a matter of calibrating the tool or as an external means of fixing bugs in the tool. Or a semiconductor manufacturing fab uses a plurality of the same tool type, the listening or intercept devices may be programmed to modify reported results without having to attempt any modification of the tools themselves. The listening or intercept devices further may be programmed to derive values calculated from values reported by the tool, without any need to extend the capabilities of the tool itself.

In a process of migration from tool control host to distributed processors, the tool control host may include comprehensive factory management processes and the distributed processors may include more limited processes, not as extensive as comprehensive factory management processes. That is, the tool control host may run software such as FAB300™. Alternatively, the tool control hosts may include legacy programs to control the tools and the distributed processors may include updated comprehensive factory management process logic, such as FAB300™. The migration process involves intelligent assistance in supplementing or supplanting an incumbent system. A further aspect of the intercept devices is that they may receive communications from both the tool control host and the distributed processor and may be programmable to select the instructions of either the incumbent or new controllers for forwarding to the tools. During a trial, the intercept device may receive communications from both the tool control host and the distributed processor and report similarities and differences between the communications. The distributed processors may include logic to schedule tools, logic to manage yield from tools, logic to manage the logistics of moving materials among tools or logic to modify production steps based on deviations from plan in prior process steps. Logic to schedule tools may include detection of the load and operational status of the tool and time to completion of a process step. Logic to manage yield from tools may include monitoring of process conditions for later comparison to yields. Logic to manage yield from tools also may include monitoring of process conditions and modification of those conditions based on prior analyses of yields. Logic to manage logistics of moving materials among tools may include reporting of events on one tool which require readiness of a tool or work piece transport process that supplies material or work pieces to the tool or uses the work piece produced by the tool. Logic to modify process steps based on deviations from plan in prior process steps may support advanced process control. In advanced process control, subsequent process steps are modified to take into account prior process steps. Deviations from plan are monitored and compensated for.

Another embodiment of the present invention includes a method of screening requests for tool status information, when requests are received from a variety of sources. The variety of sources may include a plurality of tool hosts, using tool host in a broad sense. An intercept device is provided which includes logic to retain tool status information and pending requests to tools for status information. The intercept device is positioned logically or physically in between the tool host and the tools, in communication with both. It receives a request for tool status and satisfies the request using the retained tool status information, the retained pending request for tool status information or by making one or more new requests, in much the fashion of the prior embodiment. The new requests optionally may be directed to either the tool or external sensors monitoring the tool. The external sensors may determine environmental conditions surrounding the tool or conditions of the tool itself, such as temperature, spectral emission of radiation from processes, exhaust gases, or other externally observable process parameters. Either digital or analog external sensors may be used in conjunction with the intercept device. This embodiment need not include moving processes from tool control host distributed processors. It may be useful, for instance, when one or more new hosts supplement an existing host.

One aspect of this embodiment is that the tool host may include both tool control hosts and distributed processors, as those terms have been used above. The tool control host may include comprehensive factory management processes and the distributed processors may include limited processes for less than comprehensive factory management. Alternatively the tool control host may include legacy programs to control tools and the distributed processors may include updated logic for comprehensive factory management processes. The distributed processors may include logic to schedule tools, manage yields, manage logistics or modify production steps based on deviations from plan in prior process steps.

The process of this embodiment may further include: monitoring one or more events reported by the tool and determining which tool status information is stale due to the events; expiring tool status information which is rendered stale by events reported to the intercept device by the tool; receiving one or more events reported by the tool and determining whether collection of tool status information should be modified, for instance when the tool status advances from one process step to another; determining appropriate modifications to the tool status information received from the tool and substituting modified tool status information when satisfying requests for tool status information; and determining whether a request for tool status information would be satisfied by the tool or by external sensors coupled with the tool.

The embodiments and aspects of the embodiments may be combined in permutations that are readily apparent from this description, but not enumerated with excessive particularity.

While the preceding examples are cast in terms of a method, devices and systems employing this method are easily understood. A magnetic memory containing a program capable of practicing the claimed method is one such device. A computer system having memory loaded with a program practicing the methods described is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method of migrating one or more processes from a tool control host in communication with one or more tools to one or more distributed processors, the method including:
   providing one or more intercept devices including logic to retain tool status information from one or more tools and to retain pending requests for tool status information from at least one tool control host, said intercept device positioned between and in communication with the tool control host and the tools;
   moving one or more processes from the tool control host to one or more distributed processors, said distributed processors in communication with the intercept device;
   routing requests for tool status information from the tool control host and the distributed processors to the intercept device; and
   satisfying the requests for tool status information using the retained tool status information, the retained pending requests for tool status information, and one or more new requests from the intercept device to the tools for otherwise unavailable tool status information.

2. The method of claim 1, wherein the intercept device monitors one or more events reported by the tools, further including identifying the retained tool status information that is rendered stale by the reported events and expiring the stale tool status information.

3. The method of claim 1, wherein the intercept device monitors one or more events reported by the tools and determines whether collection of tool status information should be modified in response to the reported events.

4. The method of claim 1, wherein the intercept device receives tool status information received from the tools, further including determining appropriate modifications to the tool status information received, and substituting modified tool status information when satisfying the requests for tool status information.

5. The method of claim 1, wherein the tool control host includes comprehensive factory management processes and the distributed processors include limited processes for less than comprehensive factory management processes.

6. The method of claim 1, wherein the tool control host includes legacy programs to control tools and the distributed processors include updated comprehensive factory management process logic.

7. The method of claim 1, wherein the distributed processors include logic to schedule tools.

8. The method of claim 1, wherein the distributed processors include logic to manage yield from tools.

9. The method of claim 1, wherein the distributed processors include logic to manage logistics of moving materials among tools.

10. The method of claim 1, wherein the distributed processors include logic to modify production process steps based on deviations from plan in prior process steps.

11. A method of screened response to requests for tool status information from a variety of sources, the method including:
    providing one or more intercept devices including logic to retain tool status information from one or more tools and to retain pending requests for tool status information from at least one tool host, said intercept device positioned between and in communication with the tool host and the tools;
    receiving a request for tool status information; and
    satisfying the request for tool status information using the retained tool status information, the retained pending requests for tool status information, and one or more new requests from the intercept device to the tool or the external sensors for otherwise unavailable tool status information.

12. The method of claim 11, wherein the tool host includes at least one tool control host and one or more distributed processors.

13. The method of claim 12, wherein the tool control host includes comprehensive factory management processes and the distributed processors include limited processes for less than comprehensive factory management processes.

14. The method of claim 12, wherein the tool control host includes legacy programs to control tools and the distributed processors include updated comprehensive factory management process logic.

15. The method of claim 12, wherein the distributed processors include logic to schedule tools.

16. The method of claim 12, wherein the distributed processors include logic to manage yield from tools.

17. The method of claim 12, wherein the distributed processors include logic to manage logistics of moving materials among tools.

18. The method of claim 12, wherein the distributed processors include logic to modify production process steps based on deviations from plan in prior process steps.

19. The method of claim 11, further including monitoring one or more events reported by the tool and determining which tool status information is stale due to the events.

20. The method of claim 11, further including receiving one or more events reported by the tool and determining whether collection of tool status information should be modified due to the events reported.

21. The method of claim 11, further including determining appropriate modifications to the tool status information received from the tool and substituting modified tool status information when satisfying requests for tool status information.

22. The method of claim 11, further including determining whether the request for tool status information would be satisfied by the tool or by external sensors coupled with the tool.

23. The method of claim 22, further including monitoring one or more events reported by the tool and determining which tool status information is stale due to the events.

24. The method of claim 22, further including receiving one or more events reported by the tool and determining whether collection of tool status information should be modified due to the events reported.

25. The method of claim 22, further including determining appropriate modifications to the tool status information received from the tool and substituting modified tool status information when satisfying requests for tool status information.

* * * * *